(12) United States Patent
Fattal et al.

(10) Patent No.: US 10,830,939 B2
(45) Date of Patent: *Nov. 10, 2020

(54) MULTIBEAM DIFFRACTION GRATING-BASED BACKLIGHTING

(71) Applicant: LEIA INC., Menlo Park, CA (US)

(72) Inventors: David A. Fattal, Mountain View, CA (US); Zhen Peng, Foster City, CA (US); Charles M. Santori, Palo Alto, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,422

(22) Filed: Feb. 7, 2019

(65) Prior Publication Data

US 2019/0170926 A1   Jun. 6, 2019

Related U.S. Application Data

(63) Continuation of application No. 14/908,523, filed as application No. PCT/US2013/052774 on Jul. 30, 2013, now abandoned.

(51) Int. Cl.
   *G02B 30/27* (2020.01)
   *F21V 8/00* (2006.01)
   (Continued)

(52) U.S. Cl.
   CPC ........... *G02B 6/0038* (2013.01); *G02B 6/005* (2013.01); *G02B 6/0036* (2013.01); *G02B 30/27* (2020.01);
   (Continued)

(58) Field of Classification Search
   None
   See application file for complete search history.

(56) References Cited

U.S. PATENT DOCUMENTS 5,615,024 A * 3/1997 May ................. G02F 1/133621
                                                     349/158
5,721,598 A    2/1998 Smith
                  (Continued)

FOREIGN PATENT DOCUMENTS

CN    1213097 A    4/1999
CN    1619373 A    5/2005
            (Continued)

OTHER PUBLICATIONS

International Search Report and Written Opinion (ISR/WO) of the International Searching Authority (ISA/KR) dated Apr. 29, 2014 (15 pages) for counterpart parent PCT patent application No. PCT/US2013/052774.

(Continued)

*Primary Examiner* — Phu Vu
(74) *Attorney, Agent, or Firm* — J. Michael Johnson

(57) ABSTRACT

Multibeam diffraction grating-based backlighting includes a light guide and a multibeam diffraction grating at a surface of the light guide. The light guide is configured to guide light from a light source. The multibeam diffraction grating is configured to couple out a portion of the guided light using diffractive coupling and to direct the diffractively coupled out portion away from the light guide as a plurality of light beams with different principal angular directions having directions corresponding to view directions of a multiview display.

19 Claims, 4 Drawing Sheets

(51) Int. Cl.
*G02F 1/13357* (2006.01)
*G02B 5/18* (2006.01)
(52) U.S. Cl.
CPC ...... *G02F 1/133615* (2013.01); *G02B 5/1861* (2013.01); *G02B 5/1866* (2013.01)

(56) References Cited

U.S. PATENT DOCUMENTS

| | | | |
|---|---|---|---|
| 6,064,452 A * | 5/2000 | Ogino | G02B 5/1866 349/57 |
| 6,490,393 B1 | 12/2002 | Zhou | |
| 6,980,271 B2 | 12/2005 | Fujishiro | |
| 7,742,120 B2 | 6/2010 | Bayley et al. | |
| 7,773,849 B2 | 8/2010 | Shani | |
| 7,903,332 B2 | 3/2011 | De Zwart et al. | |
| 8,026,997 B2 | 9/2011 | Feng | |
| 9,128,226 B2 * | 9/2015 | Fattal | G02B 6/0036 |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,082,613 B2 | 9/2018 | Fattal et al. | |
| 10,120,198 B2 | 11/2018 | Santori et al. | |
| 2002/0008834 A1 | 1/2002 | Suzuki | |
| 2002/0075445 A1 | 6/2002 | Dabrowski et al. | |
| 2003/0086649 A1 | 5/2003 | Zhou | |
| 2004/0130879 A1 | 7/2004 | Choi et al. | |
| 2004/0156589 A1 | 8/2004 | Gunn et al. | |
| 2005/0073627 A1 | 4/2005 | Akiyama | |
| 2005/0264717 A1 | 12/2005 | Chien et al. | |
| 2007/0058394 A1 | 3/2007 | Yu | |
| 2007/0279367 A1 | 12/2007 | Kitai | |
| 2008/0186334 A1 | 8/2008 | Seetzen | |
| 2008/0204663 A1 | 8/2008 | Balogh | |
| 2008/0204873 A1 | 8/2008 | Daniell | |
| 2008/0285307 A1 | 11/2008 | Aylward et al. | |
| 2008/0297696 A1 * | 12/2008 | Banerjee | G02B 5/3058 349/65 |
| 2009/0207342 A1 | 8/2009 | Yamaguchi et al. | |
| 2009/0213300 A1 | 8/2009 | Daiku | |
| 2009/0290837 A1 | 11/2009 | Chen et al. | |
| 2010/0103485 A1 | 4/2010 | Haussler | |
| 2010/0118117 A1 | 5/2010 | Kroll et al. | |
| 2010/0284085 A1 | 11/2010 | Laakkonen | |
| 2010/0289870 A1 | 11/2010 | Leister | |
| 2010/0302798 A1 | 12/2010 | Papakonstantinou et al. | |
| 2011/0002143 A1 | 1/2011 | Saarikko et al. | |
| 2011/0141395 A1 | 6/2011 | Yashiro | |
| 2011/0149596 A1 | 6/2011 | Lv et al. | |
| 2011/0157667 A1 | 6/2011 | Lacoste et al. | |
| 2011/0182570 A1 | 7/2011 | Yeh | |
| 2011/0254916 A1 | 10/2011 | Fan et al. | |
| 2011/0304784 A1 | 12/2011 | Hirota et al. | |
| 2012/0008067 A1 | 1/2012 | Mun et al. | |
| 2012/0075698 A1 | 3/2012 | Minami | |
| 2012/0120213 A1 | 5/2012 | Ohyama et al. | |
| 2012/0250141 A1 | 10/2012 | Chen | |
| 2013/0057539 A1 | 3/2013 | Kim | |

FOREIGN PATENT DOCUMENTS

| | | |
|---|---|---|
| CN | 202126538 U | 1/2012 |
| JP | 1997943594 A | 2/1997 |
| JP | 2009053499 A | 3/2009 |
| JP | 2009288718 A | 12/2009 |
| JP | 2009295598 A | 12/2009 |
| JP | 2011029161 A | 2/2011 |
| WO | 2012069071 A1 | 5/2012 |

OTHER PUBLICATIONS

Fattal et al., "A multi-directional backlight for a wide-angle, glasses-free three-dimensional display," Nature, Mar. 21, 2013, pp. 348-351, vol. 495, Macmillan Publishers Limited, 2013.

Son et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

* cited by examiner

MULTIBEAM DIFFRACTION GRATING-BASED BACKLIGHTING

CROSS-REFERENCE TO RELATED APPLICATIONS

This application is a continuation application of and claims the benefit of priority to pending U.S. patent application Ser. No. 14/908,523, filed Jan. 28, 2016, which claims benefit of priority to International Application No. PCT/US2013/052774, filed Jul. 30, 2013, the entire contents of both of which are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the applicability limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide multiview electronic display backlighting using multibeam diffractive coupling. In particular, backlighting of an electronic display described herein employs a multibeam diffraction grating. The multibeam diffraction grating is used to couple light out of a light guide and to direct the coupled out light in a viewing direction of the multiview electronic display. The coupled out light directed in the viewing direction by the multibeam diffraction grating includes a plurality of light beams that have different principal angular directions from one another, according to various examples of the principles described herein. In some examples, the light beams having the different principal angular directions (also referred to as 'the differently directed light beams') may be employed to display three-dimensional (3D) information. For example, the differently directed light beams produced by the multibeam diffraction grating may be modulated and serve as pixels of a 'glasses free' multiview electronic display, for example.

Figure 1:
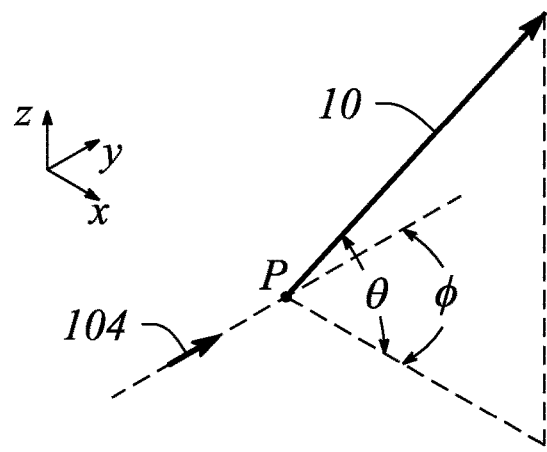
FIG. 1 illustrates graphical view of angular components $\{\theta, \phi\}$ of a light beam having a particular principal angular direction, according to an example of the principles describe herein.

According to various examples, the multibeam diffraction grating produces the plurality of light beams having a corresponding plurality of different, spatially separated angles (i.e., different principal angular directions). In particular, each light beam produced by the multibeam diffraction grating has a principal angular direction given by angular components $\{\theta, \phi\}$. The angular component $\theta$ is referred to herein as the 'elevation component' or 'elevation angle' of the light beam. The angular component $\phi$ is referred to as the 'azimuth component' or 'azimuth angle' of the light beam, herein. By definition, the elevation angle $\theta$ is an angle in a vertical plane (e.g., perpendicular to a plane of the multibeam diffraction grating) while the azimuth angle $\phi$ is an angle in a horizontal plane (e.g., parallel to the multibeam diffraction grating plane). FIG. 1 illustrates the angular components {θ, φ} of a light beam 10 having a particular principal angular direction, according to an example of the principles describe herein. In addition, each light beam is emitted or emanates from a particular point, by definition herein. That is, by definition, each light beam has a central ray associated with a particular point of origin within the multibeam diffraction grating. FIG. 1 also illustrates the light beam point of origin P.

According to various examples, the elevation component θ of the light beam is related to, and in some examples determined by, a diffraction angle $\theta_m$ of the multibeam diffraction grating. In particular, the elevation component θ may be determined by the diffraction angle $\theta_m$ local to or at the point of origin P of the light beam, according to some examples. The azimuth component φ of the light beam may be determined by an orientation or rotation of features of the multibeam diffraction grating, according to various examples. In particular, an azimuth orientation angle $\phi_f$ of the features in a vicinity of the point of origin and relative to a propagation direction of light incident on the multibeam diffraction grating may determine the azimuth component φ of the light beam (e.g., $\phi=\phi_f$), according to some examples. An example propagation direction of incident light is illustrated in FIG. 1 using a bold arrow.

According to various examples, characteristics of the multibeam diffraction grating and the features thereof (i.e., 'diffractive features') may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, a grating length, a grating pitch (feature spacing), a shape of the features, a size of the features (e.g., groove or ridge width), and an orientation of the grating. In some examples, the various characteristics used for control may be characteristics that are local to a vicinity of the point of origin of a light beam.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. For example, the diffraction grating may be a 2-D array of bumps on a material surface.

As such, and by definition herein, the diffraction grating is a structure that provides diffraction of light incident on the diffraction grating. If the light is incident on the diffraction grating from a light guide, the provided diffraction may result in, and thus be referred to as, 'diffractive coupling' in that the diffraction grating may couple light out of the light guide by diffraction. The diffraction grating also redirects or changes an angle of the light by diffraction (i.e., a diffractive angle). In particular, as a result of diffraction, light leaving the diffraction grating (i.e., diffracted light) generally has a different propagation direction than a propagation direction of the incident light. The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Specifically herein, 'diffractive coupling' is defined as coupling of an electromagnetic wave (e.g., light) across a boundary between two materials as a result of diffraction (e.g., by a diffraction grating). For example, a diffraction grating may be used to couple out light propagating in a light guide by diffractive coupling across a boundary of the light guide. The diffractive coupling substantially overcomes total internal reflection that guides the light within the light guide to couple out the light, for example. Similarly, 'diffractive redirection' is the redirection or change in propagation direction of light as a result of diffraction, by definition. Diffractive redirection may occur at the boundary between two materials if the diffraction occurs at that boundary (e.g., the diffraction grating is located at the boundary).

Further by definition herein, the features of a diffraction grating are referred to as 'diffractive features' and may be one or more of at, in and on a surface (e.g., a boundary between two materials). The surface may be a surface of a light guide, for example. The diffractive features may include any of a variety of structures that diffract light including, but not limited to, grooves, ridges, holes and bumps at, in or on the surface. For example, the multibeam diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a rectangular profile, a triangular profile and a saw tooth profile.

By definition herein, a 'multibeam diffraction grating' is a diffraction grating that produces a plurality of light beams. In some examples, the multibeam diffraction grating may be or include a 'chirped' diffraction grating. The light beams of the plurality produced by the multibeam diffraction grating may have different principal angular directions denoted by the angular components {θ, φ}, as described above. In particular, according to various examples, each of the light beams may have a predetermined principal angular direction as a result of diffractive coupling and diffractive redirection of incident light by the multibeam diffraction grating. For example, the multibeam diffraction grating may produce eight (8) light beams in eight different principal directions. According to various examples, the elevation angle θ of the light beam may be determined by a diffraction angle $\theta_m$ of the multibeam diffraction grating, while the azimuth angle φ may be associated with an orientation or rotation of features of the multibeam diffraction grating at a point of origin of the light beam relative to a propagation direction of light incident on the multibeam diffraction grating, as described above.

According to various examples, a diffraction angle $\theta_m$ provided by a locally periodic, transmissive diffraction grating may be given by equation (1) as:

$$\theta_m = \sin^{-1}\left(\frac{m\lambda}{d} - n \cdot \sin\theta_i\right) \quad (1)$$

where λ is a wavelength of the light, m is a diffraction order, d is a distance between features of the diffraction grating, $\theta_i$ is an angle of incidence of the light on the diffraction grating, and n is a refractive index of a material (e.g., a liquid crystal) on a side of the diffraction grating from which light is incident on the diffraction grating (i.e., 'light-incident' side). Equation (1) assumes that a refractive index on a side of the diffraction grating opposite the light-incident side has a refractive index of one. If the refractive index on the side opposite the light-incident side is not one, then equation (1) may be modified accordingly. Herein, the plurality of light beams produced by the multibeam diffraction grating may all have the same diffractive order m, according to various examples.

Further herein, a 'light guide' is defined as a structure that guides light within the structure using total internal reflection. In particular, the light guide may include a core that is substantially transparent at an operational wavelength of the light guide. In some examples, the term 'light guide' generally refers to a dielectric optical waveguide that provides total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may be any of several light guides including, but not limited to, one or both of a plate or slab guide and a strip guide.

Further herein, the term 'plate' when applied to a light guide as in a 'plate light guide' is defined as a piecewise or differentially planar layer or sheet. In particular, a plate light guide is defined as a light guide configured to guide light in two substantially orthogonal directions bounded by a top surface and a bottom surface of the light guide. Further, by definition herein, the top and bottom surfaces are both separated from one another and substantially parallel to one another in a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

Further still, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

Figure 2A:
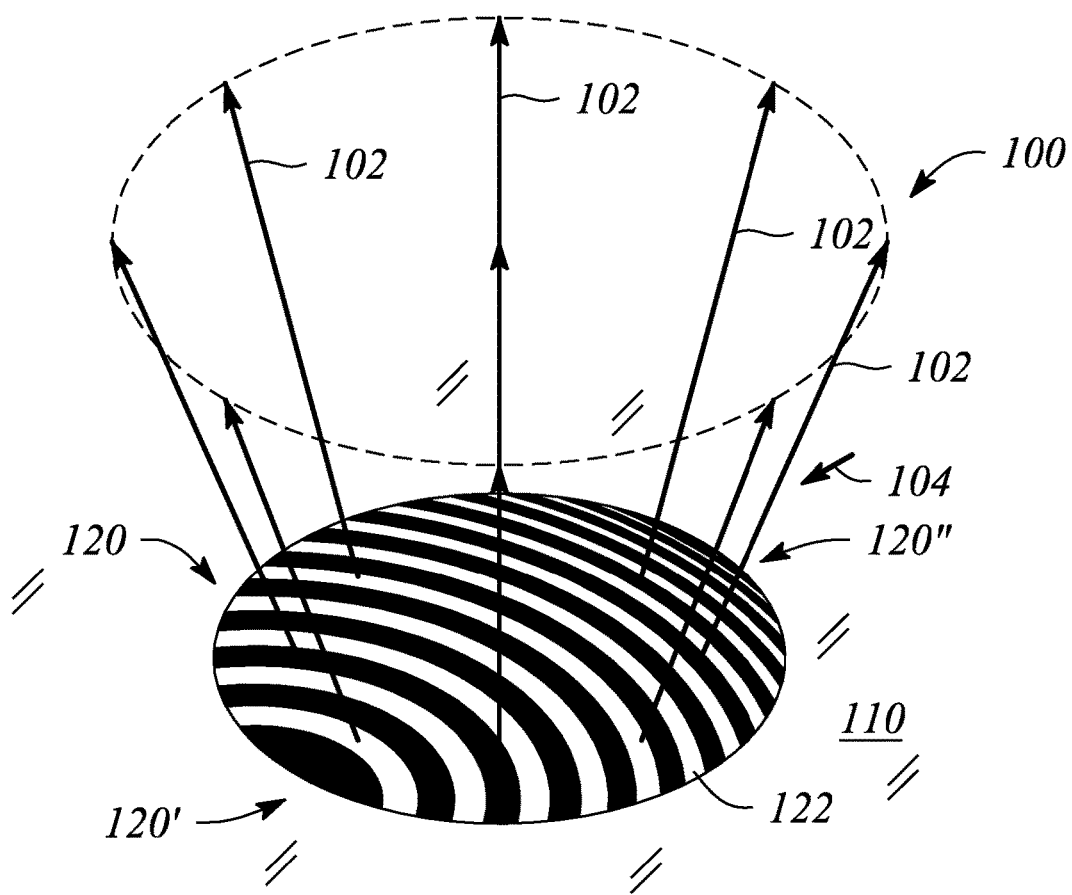
FIG. 2A illustrates a perspective view of a multibeam diffraction grating-based backlight, according to an example consistent with the principles described herein.
Figure 2B:
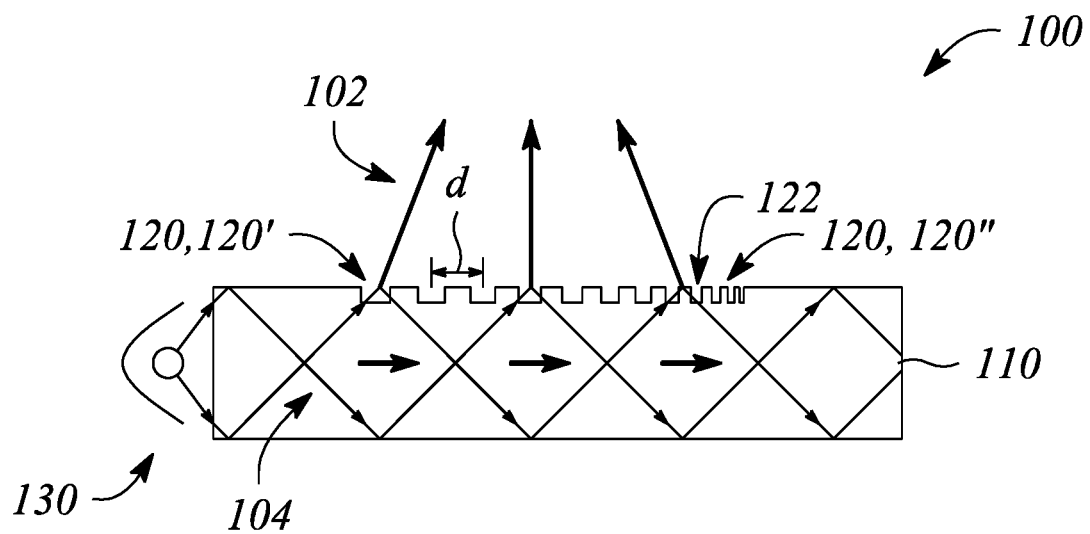
FIG. 2B illustrates a cross sectional view of a multibeam diffraction grating-based backlight, according to another example consistent with the principles described herein.
Figure 2C:
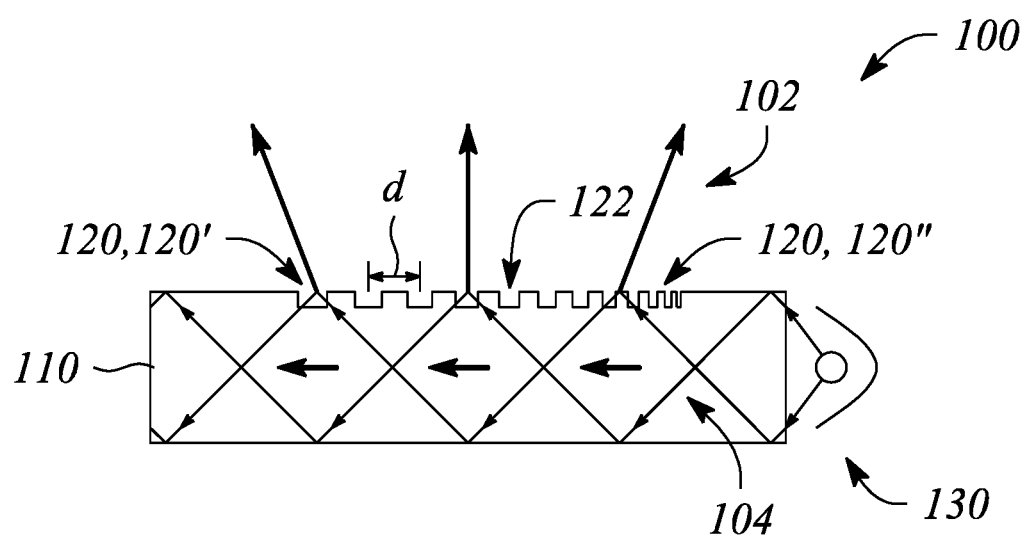
FIG. 2C illustrates a cross sectional view of a multibeam diffraction grating-based backlight, according to another example consistent with the principles described herein.

FIG. 2A illustrates a perspective view of a multibeam diffraction grating-based backlight 100, according to an example consistent with the principles described herein. FIG. 2B illustrates a cross sectional view of a multibeam diffraction grating-based backlight 100, according to another example consistent with the principles described herein. FIG. 2C illustrates a cross sectional view of a multibeam diffraction grating-based backlight 100, according to another example consistent with the principles described herein. According to various examples, the multibeam diffraction grating-based backlight 100 is configured to provide a plurality of light beams 102 directed away from the multibeam diffraction grating-based backlight 100. In particular, the plurality of light beams 102 is directed away from the multibeam diffraction grating-based backlight 100 in different principal angular directions. In some examples, the plurality of light beams 102 forms a plurality of pixels of an electronic display. In some examples, the electronic display is a so-called 'glasses free' three-dimensional (3D) display (e.g., a multiview display). As such, the different principal angular directions of the plurality of light beams may correspond to directions of different views of a multiview display.

According to various examples, a light beam 102 of the plurality of light beams provided by the multibeam diffraction grating-based backlight 100 is configured to have a different principal angular direction from other light beams 102 of the plurality (e.g., see FIGS. 2B and 2C). Further, the light beam 102 may have both a predetermined direction (principal angular direction) and a relatively narrow angular spread. In some examples, the light beams 102 may be individually modulated (e.g., by a light valve as described below). The individual modulation of the light beams 102 directed in different directions away from the multibeam diffraction grating-based backlight 100 may be particularly useful for multiview electronic display applications that employ relatively thick light valves, for example.

As illustrated in FIGS. 2A-2C, the multibeam diffraction grating-based backlight 100 includes a light guide 110. The light guide 110 is configured to guide light as guided light 104 (e.g., from a light source 130). In some examples, the light guide 110 guides the guided light 104 using total internal reflection. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

For example, the light guide 110 may be a slab or plate optical waveguide that is an extended, substantially planar sheet of optically transparent material (e.g., as illustrated in cross section in FIGS. 2B and 2C and from the top in FIG. 2A). The substantially planar sheet of dielectric material is configured to guide the guided light 104 through total internal reflection. In some examples, the light guide 110 may include a cladding layer on at least a portion of a surface of the light guide 110 (not illustrated). The cladding layer may be used to further facilitate total internal reflection, for example.

In some examples, the guided light 104 may be coupled into an end of the light guide 110 to propagate and be guided along a length of the light guide 110. One or more of a lens, a mirror and a prism (not illustrated), for example may facilitate the coupling of the light into the end or an edge of the light guide 110. According to various examples, the optically transparent material of the light guide 110 may include or be made up of any of a variety of dielectric materials including, but not limited to, various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.).

As further illustrated in FIGS. 2B and 2C, the guided light 104 may propagate along the light guide 110 in a generally horizontal direction. Propagation of the guided light 104 is illustrated from left to right in FIG. 2B as several bold horizontal arrows representing various propagating optical beams within the light guide 110. FIG. 2C illustrates propagation of the guided light 104 from right to left, also as several horizontal arrows. The propagating optical beams may represent plane waves of propagating light associated with one or more of the optical modes of the light guide 110, for example. The propagating optical beams of the guided light 104 may propagate by 'bouncing' or reflecting off of walls of the light guide 110 at an interface between the material (e.g., dielectric) of the light guide 110 and the surrounding medium due to total internal reflection, for example.

According to various examples, the multibeam diffraction grating-based backlight 100 further includes a multibeam diffraction grating 120. The multibeam diffraction grating 120 is located at a surface of the light guide 110 and is configured to couple out a portion or portions of the guided light 104 from the light guide 110 by or using diffractive coupling. In particular, the coupled out portion of the guided light 104 is diffractively redirected away from the light guide surface as the plurality of light beams 102. As discussed above, each of the light beams 102 of the plurality have a different principal angular direction, according to various examples.

In particular, FIG. 2B illustrates the plurality of light beams 102 as converging while FIG. 2C illustrates the light beams 102 of the plurality as diverging. Whether the light beams 102 are converging (FIG. 2B) or diverging (FIG. 2C) may be determined by a direction of the guided light 104, for example. In some examples where the light beams 102 are diverging, the diverging light beams 102 may appear to be diverging from a 'virtual' point (not illustrated) located some distance below or behind the multibeam diffraction grating 120. Similarly, the converging light beams 102 may converge to a point (not illustrated) above or in front of the multibeam diffraction grating 120, according to some examples.

According to various examples, the multibeam diffraction grating 120 includes a plurality of diffractive features 122 that provide diffraction. The provided diffraction is responsible for the diffractive coupling of the guided light 104 out of the light guide 110. For example, the multibeam diffraction grating 120 may include one or both of grooves in a surface of the light guide 110 and ridges protruding from the light guide surface that serve as the diffractive features 122. The grooves and ridges may be arranged parallel to one another and, at least at some point, perpendicular to a propagation direction of the guided light 104 that is to be coupled out by the multibeam diffraction grating 120.

In some examples, the grooves and ridges may be etched, milled or molded into the surface or applied on the surface. As such, a material of the multibeam diffraction grating 120 may include a material of the light guide 110. As illustrated in FIG. 2A, the multibeam diffraction grating 120 includes substantially parallel grooves that penetrate the surface of the light guide 110. In other examples (not illustrated), the multibeam diffraction grating 120 may be a film or layer applied or affixed to the light guide surface. The multibeam diffraction grating 120 may be deposited on the light guide surface, for example.

The multibeam diffraction grating 120 may be arranged in a variety of configurations at, on or in the surface of the light guide 110, according to various examples. For example, the multibeam diffraction grating 120 may be a member of a plurality of gratings (e.g., multibeam diffraction gratings) arranged in columns and rows across the light guide surface. In another example, a plurality of multibeam diffraction gratings 120 may be arranged in groups (e.g., a group of three gratings, each grating in the group being associated with a different color of light) and the groups may be arranged in rows and columns. In yet another example, the plurality of multibeam diffraction gratings 120 may be distributed substantially randomly across the surface of the light guide 110.

According to some examples, the multibeam diffraction grating 120 may include a chirped diffraction grating. By definition, the chirped diffraction grating is a diffraction grating exhibiting or having a diffraction spacing d of the diffractive features that varies across an extent or length of the chirped diffraction grating, as illustrated in FIGS. 2A-2C. Herein, the varying diffraction spacing d is referred to as a 'chirp'. As a result, guided light 104 that is diffractively coupled out of the light guide 110 exits or is emitted from the chirped diffraction grating as the light beam 102 at different diffraction angles $\theta_m$ corresponding to different points of origin across the chirped diffraction grating, e.g., see equation (1) above. By virtue of the chirp, the chirped diffraction grating of the multibeam diffraction grating 120 may produce the plurality of light beams 102 having different principal angular directions in terms of the elevation component θ of the light beams 102.

In some examples, the chirped diffraction grating of the multibeam diffraction grating 120 may have or exhibit a chirp of the diffractive spacing d that varies linearly with distance. As such, the chirped diffraction grating may be referred to as a 'linearly chirped' diffraction grating. FIGS. 2B and 2C illustrates the multibeam diffraction grating 120 as a linearly chirped diffraction grating, for example. As illustrated, the diffractive features 122 are closer together at a second end 120" of the multibeam diffraction grating 120 than at a first end 120'. Further, the diffractive spacing d of the illustrated diffractive features 122 varies linearly from the first end 120' to the second end 120".

In some examples, light beams 102 produced by coupling light out of the light guide 110 using the multibeam diffraction grating 120 including the chirped diffraction grating may converge (i.e., be converging light beams 102) when the guided light 104 propagates in a direction from the first end 120' to the second end 120" (e.g., as illustrated in FIG. 2B). Alternatively, diverging light beams 102 may be produced when the guided light 104 propagates from the second end 120" to the first end 120' (e.g., as illustrated in FIG. 2C), according to other examples.

In another example (not illustrated), the chirped diffraction grating of the multibeam diffraction grating 120 may exhibit a non-linear chirp of the diffractive spacing d. Various non-linear chirps that may be used to realize the chirped diffraction grating include, but are not limited to, an exponential chirp, a logarithmic chirp and a chirp that varies in another, substantially non-uniform or random but still monotonic manner. Non-monotonic chirps such as, but not limited to, a sinusoidal chirp and a triangle or sawtooth chirp, may also be employed.

According to some examples, the diffractive features 122 within the multibeam diffraction grating 120 may have varying orientations relative to an incident direction of the guided light 104. In particular, an orientation of the diffractive features 122 at a first point within the multibeam diffraction grating 120 may differ from an orientation of the diffractive features 122 at another point. As described above, an azimuthal component of the principal angular direction $\{\theta, \phi\}$ of the light beam 102 may be determined by or correspond to the azimuthal orientation angle $\phi_f$ of the diffractive features 122 at a point of origin of the light beam 102, according to some examples. As such, the varying orientations of the diffractive features 122 within the multibeam diffraction grating 120 produce different light beams 102 having different principal angular directions $\{\theta, \phi\}$, at least in terms of their respective azimuthal components $\phi$.

In some examples, the multibeam diffraction grating 120 may include diffractive features 122 that are either curved or arranged in a generally curved configuration. For example, the diffractive features 122 may include one of curved grooves and curved ridges that are spaced apart from one another along radius of the curve. FIG. 2A illustrates curved diffractive features 122 as curved, spaced apart grooves, for example. At different points along the curve of the diffractive feature 122, an 'underlying diffraction grating' of the multibeam diffraction grating 120 associated with the curved diffractive features 122 has a different azimuthal orientation angle $\phi_f$. In particular, at a given point along the curved diffractive features 122 the curve has a particular azimuthal orientation angle $\phi_f$ that generally differs from another point along the curved diffractive feature 122. Further, the particular azimuthal orientation angle $\phi_f$ results in a corresponding azimuthal component of a principal angular direction $\{\theta, \phi\}$ of a light beam 102 emitted from the given point. In some examples, the curve of the diffractive feature(s) (e.g., groove, ridge, etc.) may represent a section of a circle. The circle may be coplanar with the light guide surface. In other examples, the curve may represent a section of an ellipse or another curved shape, e.g., that is coplanar with the light guide surface.

In other examples, the multibeam diffraction grating 120 may include diffractive features 122 that are 'piecewise' curved. In particular, while the diffractive feature may not describe a substantially smooth or continuous curve per se, at different points along the diffractive feature within the multibeam diffraction grating 120, the diffractive feature still may be oriented at different angles with respect to the incident direction of the guided light 104. For example, the diffractive feature 122 may be a groove including a plurality of substantially straight segments, each segment having a different orientation than an adjacent segment. Together, the different angles of the segments may approximate a curve (e.g., a segment of a circle), according to various examples. See FIG. 3, which is described below. In yet other examples, the features may merely have different orientations relative to the incident direction of the guided light at different locations within the multibeam diffraction grating 120 without approximating a particular curve (e.g., a circle or an ellipse).

In some examples, the multibeam diffraction grating 120 may include both differently oriented diffractive features 122 and a chirp of the diffractive spacing d. In particular, both the orientation and the spacing d between the diffractive features 122 may vary at different points within the multibeam diffraction grating 120. For example, the multibeam diffraction grating 120 may include a curved and chirped diffraction grating having grooves or ridges that are both curved and vary in spacing d as a function of a radius of the curve.

FIG. 2A illustrates the multibeam diffraction grating 120 including diffractive features 122 (e.g., grooves or ridges) that are both curved and chirped (i.e., is a curved, chirped diffraction grating). An example incident direction of the guided light 104 is illustrated by a bold arrow in FIG. 2A. FIG. 2A also illustrates the plurality of emitted light beams 102 provided by diffractive coupling as arrows pointing away from the surface of the light guide 110. As illustrated, the light beams 102 are emitted in a plurality of different principal angular directions. In particular, different principal angular directions of the emitted light beams 102 are different in both azimuth and elevation, as illustrated. Nine separate light beams 102 are illustrated in FIG. 2A, by way of example and not limitation. As discussed above, the chirp of the diffractive features 122 may be substantially responsible for an elevation component of the different principal angular directions, while the curve of the diffractive features 122 may be substantially responsible for the azimuthal component, according to some examples.

Figure 3:
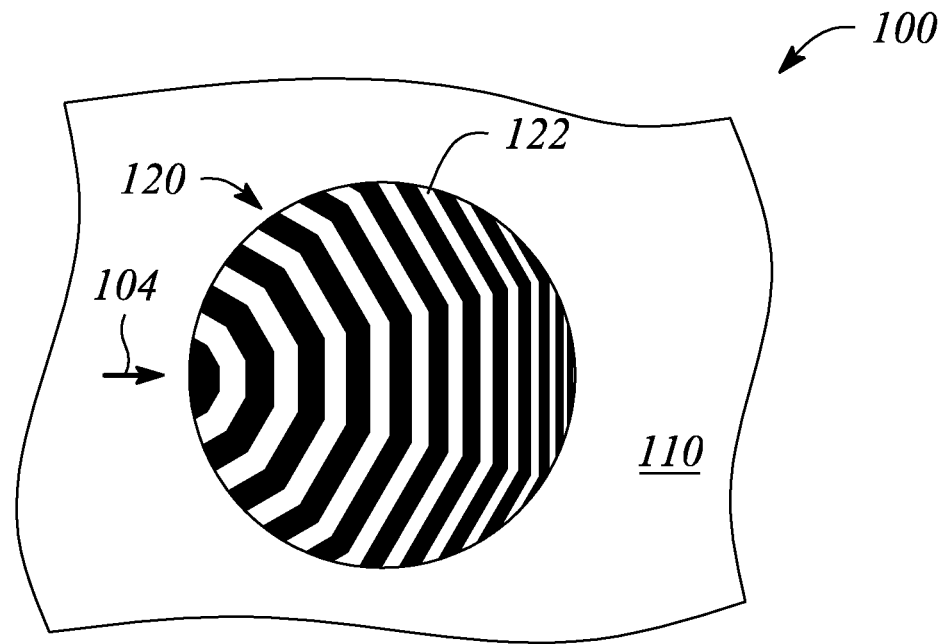
FIG. 3 illustrates a plan view of a multibeam diffraction grating, according to another example consistent with the principles described herein.

FIG. 3 illustrates a plan view of a multibeam diffraction grating 120, according to another example consistent with the principles described herein. As illustrated, the multibeam diffraction grating 120 is on a surface of a light guide 110 and includes diffractive features 122 that are both piece-wise curved and chirped. An example incident direction of guided light 104 is illustrated by a bold arrow in FIG. 3.

Referring to again to FIGS. 2B and 2C, the multibeam diffraction grating-based backlight 100 may further include the light source 130, according to some examples. The light source 130 may be configured to provide light that, when coupled into the light guide 110, is the guided light 104. In various examples, the light source 130 may be substantially any source of light including, but not limited to, one or more of a light emitting diode (LED), a fluorescent light and a laser. In some examples, the light source 130 may produce a substantially monochromatic light having a narrowband spectrum denoted by a particular color. In particular, the color of the monochromatic light may be a primary color of a particular color gamut or color model (e.g., a red-green-blue (RGB) color model). The light source 130 may be a red LED and the monochromatic light is substantially the color red. The light source 130 may be a green LED and the monochromatic light is substantially green in color. The light source 130 may be a blue LED and the monochromatic light is substantially blue in color. In other examples, the light provided by the light source 130 has a substantially broadband spectrum. For example, the light produced by the light source 130 may be white light. The light source 130 may be a fluorescent light that produces white light. In some examples, the guided light 104 may be light from the light source 130 that is coupled into an end or an edge of the light guide 110. A lens (not illustrated) may facilitate coupling of light into the light guide 110 at the end or edge thereof, for example.

In some examples, the multibeam diffraction grating-based backlight 100 is substantially transparent. In particular, both of the light guide 110 and the multibeam diffraction grating 120 may be optically transparent in a direction orthogonal to a direction of guided light propagation in the light guide 110, according to some examples. Optical transparency may allow objects on one side of the multibeam diffraction grating-based backlight 100 to be seen from an opposite side, for example.

According to some examples of the principles described herein, an electronic display is provided. According to various examples, the electronic display is configured to emit modulated light beams as pixels of the electronic display. Further, in various examples, the emitted modulated light beams may be preferentially directed toward a viewing direction of the electronic display as a plurality of differently directed light beams. In some examples, the electronic display is a multiview electronic display (e.g., a glasses-free 3-D or multiview electronic display). Different ones of the modulated, differently directed light beams may correspond to different 'views' associated with the multiview electronic display, according to various examples. The different 'views' may provide a 'glasses free' (e.g., autostereoscopic) representation of information being displayed by the multiview electronic display, for example.

Figure 4:
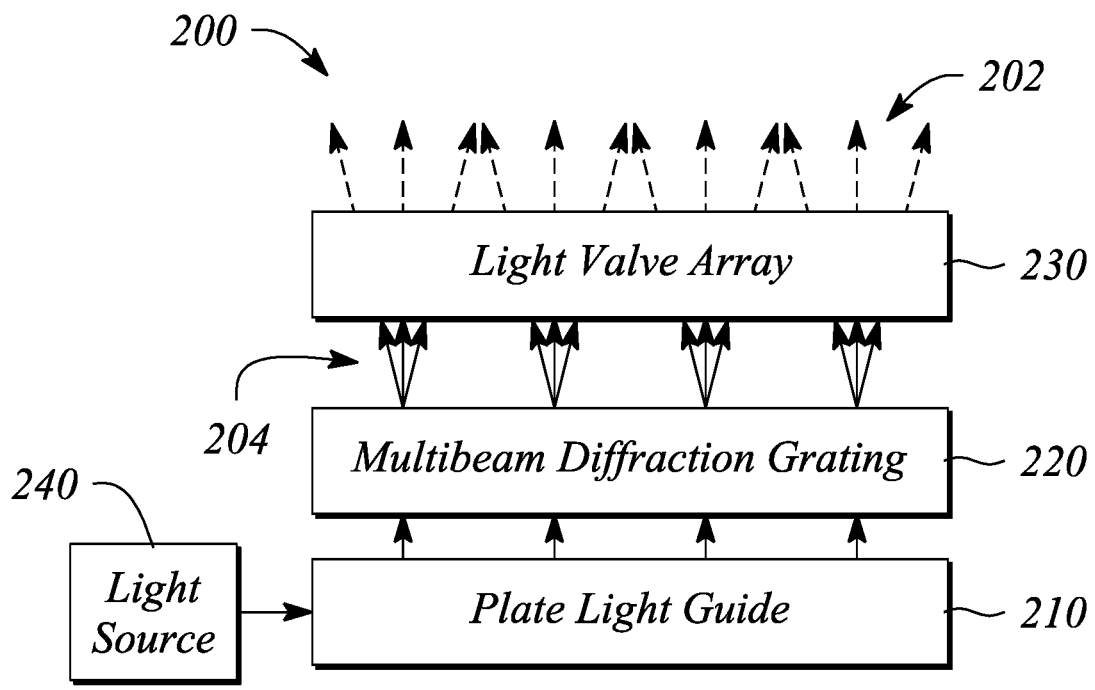
FIG. 4 illustrates a block diagram of a multiview electronic display, according to an example consistent with the principles described herein.

FIG. 4 illustrates a block diagram of a multiview electronic display 200, according to an example consistent with the principles described herein. In particular, the multiview electronic display 200 illustrated in FIG. 4 is a multiview electronic display 200 (e.g., a 'glasses free' 3-D electronic display) configured to emit modulated light beams 202. The emitted, modulated light beams 202 are illustrated as diverging (e.g., as opposed to converging) in FIG. 4 by way of example and not limitation.

The multiview electronic display 200 illustrated in FIG. 4 includes a plate light guide 210 configured to guide light as guided light. The guided light in the plate light guide 210 is a source of the light that becomes the modulated light beams 202 emitted by the multiview electronic display 200. According to some examples, the plate light guide 210 may be substantially similar to the light guide 110 described above with respect to multibeam diffraction grating-based backlight 100. For example, the plate light guide 210 may be a slab optical waveguide that is a planar sheet of dielectric material configured to guide light by total internal reflection.

The multiview electronic display 200 illustrated in FIG. 4 further includes a multibeam diffraction grating 220. In some examples, the multibeam diffraction grating 220 may be substantially similar to the multibeam diffraction grating 120 of the multibeam diffraction grating-based backlight 100, described above. In particular, the multibeam diffraction grating 220 is configured to couple out a portion of the guided light as a plurality of light beams 204. Further, the multibeam diffraction grating 220 is configured to direct the light beams 204 in a corresponding plurality of different principal angular directions. In some examples, the multibeam diffraction grating 220 includes a chirped diffraction grating. In some examples, diffractive features (e.g., grooves, ridges, etc.) of the multibeam diffraction grating 220 are curved diffractive features. In yet other examples, the multibeam diffraction grating 220 includes a chirped diffraction grating having curved diffractive features. For example, the curved diffractive features may include a ridge or a groove that is curved (i.e., continuously curved or piece-wise curved) and a spacing between the curved diffractive features that may vary as a function of distance across the multibeam diffraction grating 220.

In some examples, the multibeam diffraction grating 220 is a member of a plurality of diffraction gratings distributed across the plate light guide. Diffraction gratings of the diffraction grating plurality including the multibeam diffraction grating are arranged in rows and columns on the light guide surface, in some examples. As such, the multiview electronic display 200 may also comprise a plurality of diffraction gratings.

As illustrated in FIG. 4, the multiview electronic display 200 further includes a light valve array 230. The light valve array 230 includes a plurality of light valves configured to modulate the differently directed light beams 204 of the plurality, according to various examples. In particular, the light valves of the light valve array 230 modulate the differently directed light beams 204 to provide the modulated light beams 202 that are the pixels of the multiview electronic display 200. Moreover, different ones of the modulated, differently directed, light beams 202 may correspond to different views of the multiview electronic display 200. In various examples, different types of light valves in the light valve array 230 may be employed including, but not limited to, liquid crystal light valves and electrophoretic light valves. Dashed lines are used in FIG. 4 to emphasize modulation of the light beams 202.

According to various examples, the light valve array 230 employed in the multiview electronic display 200 may be relatively thick or equivalently may be spaced apart from the multibeam diffraction grating 220 by a relatively large distance. In some examples, the light valve array 230 (e.g., using the liquid crystal light valves) may be spaced apart from the multibeam diffraction grating 220 or equivalently have a thickness that is greater than about 50 micrometers. In some examples, the light valve array 230 may be spaced apart from the multibeam diffraction grating 220 or include a thickness that is greater than about 100 micrometers. In yet other examples, the thickness or spacing may be greater than about 200 micrometers. A relatively thick light valve array 230 or a light valve array 230 that is spaced apart from the multibeam diffraction grating 220 may be employed since the multibeam diffraction grating 220 provides light beams 204 directed in a plurality of different principal angular directions, according to various examples of the principles described herein. In some examples, the relatively thick light valve array 230 may be commercially available (e.g., a commercially available liquid crystal light valve array).

In some examples (e.g., as illustrated in FIG. 4), the multiview electronic display 200 further includes a light source 240. The light source 240 is configured to provide light that propagates in the plate light guide 210 as the guided light. In particular, the guided light is light from the light source 240 that is coupled into the edge of the plate light guide 210, according to some examples. In some examples, the light source 240 is substantially similar to the light source 130 described above with respect to the multibeam diffraction grating-based backlight 100. For example, the light source 240 may include an LED of a particular color (e.g., red, green, blue) to provide monochromatic light or a broadband light source such as, but not limited to, a fluorescent light to provide broadband light (e.g., white light).

Figure 5:
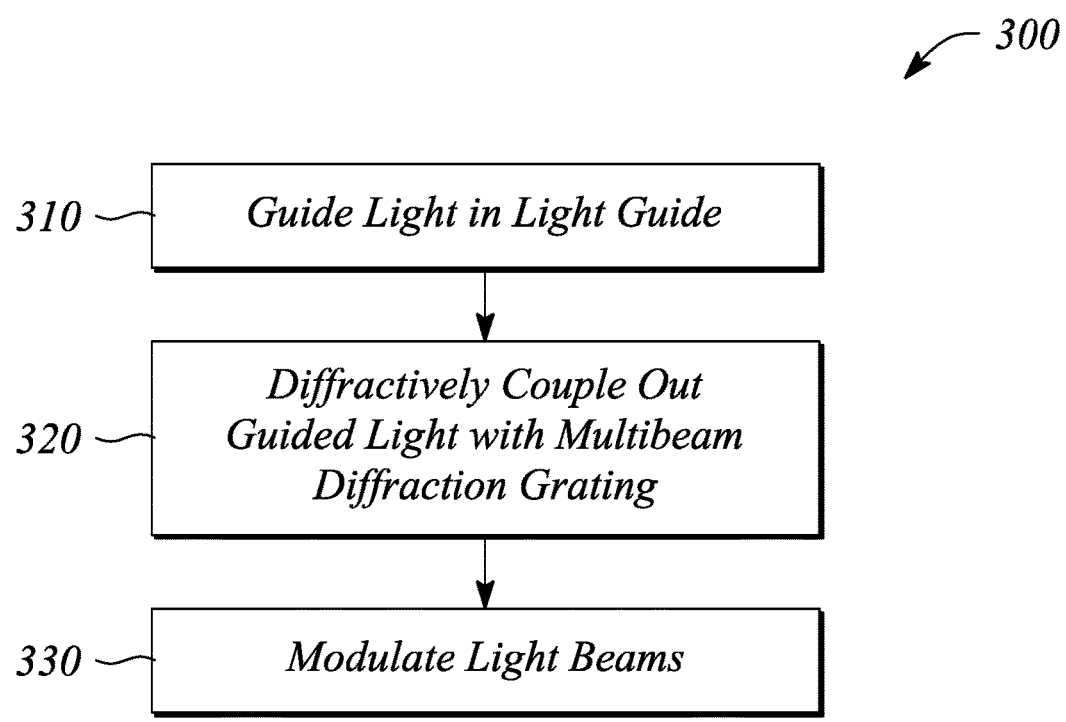
FIG. 5 illustrates a flow chart of a method of multiview display operation, according to an example consistent with the principles described herein.

According to some examples of the principles described herein, a method of multiview display operation is provided. FIG. 5 illustrates a flow chart of a method 300 of multiview display operation, according to an example consistent with the principles described herein. As illustrated, the method 300 of multiview display operation includes guiding 310 light in a light guide as guided light. In some examples, the light guide and the guided light may be substantially similar to the light guide 110 and guided light 104, described above with respect to the multibeam diffraction grating-based backlight 100. In particular, in some examples, the light guide may guide 310 the guided light according to total internal reflection. Further, the light guide may be a substantially planar dielectric optical waveguide (e.g., a plate light guide), in some examples.

The method 300 of multiview display operation further includes diffractively coupling out 320 a portion of the guided light using a multibeam diffraction grating. According to various examples, the multibeam diffraction grating is located at a surface of the light guide. For example, the multibeam diffraction grating may be formed in the surface of the light guide as grooves, ridges, etc. In other examples, the multibeam diffraction grating may include a film on the light guide surface. In some examples, the multibeam diffraction grating is substantially similar to the multibeam diffraction grating 120 described above with respect to the multibeam diffraction grating-based backlight 100. In particular, the multibeam diffraction grating produces a plurality of light beams from the diffractively coupled out 320 portion of the guided light. Further, each light beam of the light beam plurality propagates away from the light guide surface at a different principal angular direction from other light beams of the light beam plurality. According to various examples, the different principal angular directions of the light beams of the light beam plurality collectively have principal angular directions corresponding to directions of different views of the multiview display.

In some examples, the method 300 of multiview display operation further includes modulating 330 the light beams of the plurality of light beams using a corresponding plurality of light valves. In particular, the plurality of light beams may be modulated 330 by passing through or otherwise interacting with the corresponding plurality of light valves. The modulated light beams may form pixels of a three-dimensional (3D) or multiview display, according to some examples. For example, the modulated light beams may provide a plurality of views of the multiview display (e.g., a glasses-free, 3D electronic display).

In some examples, the plurality of light valves used in modulating 330 the plurality of light beams is substantially similar to the light valve array 230 described above with respect to the multiview electronic display 200. For example, the light valves may include liquid crystal light valves. In another example, the light valves may be another type of light valve including, but not limited to, an electrowetting light valve and an electrophoretic light valve.

In some examples (not illustrated), the method 300 of multiview display operation further comprises providing the light to be guided in the light guide using a light source coupled to an edge of the light guide. The light source may be substantially similar to the light source 130 of the above-described multibeam diffraction grating-based backlight 100, in some examples. Further, in some examples, the multibeam diffraction grating may comprise a chirped diffraction grating having curved diffractive features, a curve of the curved diffractive features defining or at least partially defining the different principal angular direction of light beams of the light beam plurality. In some embodiments, the multibeam diffraction grating is a member of a plurality of multibeam diffraction grating, multibeam diffraction gratings of the multibeam diffraction grating plurality being arranged in rows and columns on the light guide surface.

Thus, there have been described examples of a multibeam diffraction grating-based backlight, a multiview electronic display and a method of multiview display operation that employ multibeam diffraction gratings to provide a plurality of differently directed light beams having principal angular directions corresponding directions of different views of the multiview display. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multibeam diffraction grating-based backlight comprising:
   a light guide configured to guide light from a light source as guided light; and
   a plurality of multibeam diffraction gratings arranged across the light guide, each multibeam diffraction grating of the multibeam diffraction grating plurality being configured to couple out a portion of the guided light using diffractive coupling, the diffractively coupled-out portion of the guided light being directed away from a surface of the light guide as a plurality of light beams, a light beam of the light beam plurality having a different principal angular direction from other light beams of the light beam plurality,
   wherein different principal angular directions of the plurality of light beams correspond to directions of different views of a multiview display, wherein the multibeam diffraction grating comprises a chirped diffraction grating having curved diffractive features, a curve of the curved diffractive features being configured to partially define the different principal angular directions of the plurality of light beams.

2. The multibeam diffraction grating-based backlight of claim 1, wherein multibeam diffraction gratings of the multibeam diffraction grating plurality are arranged in rows and columns on the surface of the light guide.

3. The multibeam diffraction grating-based backlight of claim 1, wherein the multibeam diffraction grating comprises a chirped diffraction grating.

4. The multibeam diffraction grating-based backlight of claim 3, wherein the chirped diffraction grating is a linearly chirped diffraction grating.

5. The multibeam diffraction grating-based backlight of claim 1, wherein the multibeam diffraction grating comprises one of curved grooves and curved ridges that are spaced apart from one another.

6. The multibeam diffraction grating-based backlight of claim 1, further comprising the light source at an edge of the light guide, the guided light being light from the light source that is coupled into the edge of the light guide.

7. The multibeam diffraction grating-based backlight of claim 1, wherein the light guide and the multibeam diffraction grating are substantially transparent in a direction orthogonal to a direction in which the light is configured to be guided in the light guide.

8. An electronic display comprising the multibeam diffraction grating-based backlight of claim 1, wherein the portion of the guided light is configured to be diffractively coupled out by the multibeam diffraction grating is light corresponding to a pixel of the electronic display, the electronic display being the multiview display.

9. The electronic display of claim 8, further comprising a light valve configured to modulate the light beam of the plurality of light beams, the multibeam diffraction grating being between the light valve and the surface of the light guide.

10. A multiview electronic display comprising:
    a plate light guide configured to guide light from a light source as guided light;
    a plurality of diffraction gratings distributed across the plate light guide, a multibeam diffraction grating of the diffraction grating plurality being configured to diffractively couple out a portion of the guided light as a plurality of light beams having a corresponding plurality of different principal angular directions associated with different views of the multiview electronic display; and a light valve array configured to modulate the light beams of the light beam plurality to provide a plurality of modulated light beams, wherein the plurality of modulated light beams having different principal angular directions represent pixels of the different views of the multiview electronic display, different ones of the modulated light beams having directions corresponding to different ones of the different views of the multiview electronic display.

11. The multiview electronic display of claim 10, wherein diffraction gratings of the diffraction grating plurality including the multibeam diffraction grating are arranged in rows and columns at a surface of the plate light guide.

12. The multiview electronic display of claim 10, wherein the multibeam diffraction grating comprises a chirped diffraction grating having curved diffractive features.

13. The multiview electronic display of claim 10, wherein the light valve array comprises a plurality of liquid crystal light valves.

14. The multiview electronic display of claim 10, further comprising the light source, the guided light being light from the light source that is coupled into an edge of the plate light guide.

15. A method of operating a multiview display, the method comprising:

guiding light in a light guide as guided light; and diffractively coupling out a portion of the guided light using a multibeam diffraction grating at a surface of the light guide to produce a plurality of light beams, each light beam of the light beam plurality propagating away from the light guide surface at a different principal angular direction from other light beams of the light beam plurality, wherein different principal angular directions of light beams of the light beam plurality collectively have principal angular directions corresponding to directions of different views of the multiview display.

16. The method of operating a multiview display of claim 15, further comprising modulating the plurality of light beams using a corresponding plurality of light valves, the modulated light beams forming pixels associated with the different views of the multiview display.

17. The method of operating a multiview display of claim 15, wherein the multibeam diffraction grating is a member of a plurality of multibeam diffraction grating, multibeam diffraction gratings of the multibeam diffraction grating plurality being arranged in rows and columns on the light guide surface.

18. The method of operating a multiview display of claim 15, wherein the multibeam diffraction grating comprises a chirped diffraction grating having curved diffractive features, a curve of the curved diffractive features partially defining the different principal angular directions of light beams of the light beam plurality.

19. The method of operating a multiview display of claim 15, further comprising providing the light to be guided in the light guide using a light source coupled to an edge of the light guide.

* * * * *